United States Patent [19]
Sato

[11] Patent Number: 5,736,071
[45] Date of Patent: Apr. 7, 1998

[54] TRANSPARENT CONDUCTIVE DOUBLE OXIDE AND METHOD FOR PRODUCING SAME

[75] Inventor: Keiji Sato, Ube, Japan

[73] Assignee: Central Glass Company, Limited, Yamaguchi, Japan

[21] Appl. No.: 784,327

[22] Filed: Jan. 16, 1997

[30] Foreign Application Priority Data

Jan. 18, 1996 [JP] Japan .................... 8-006824
Jan. 18, 1996 [JP] Japan .................... 8-006825

[51] Int. Cl.$^6$ ............... H01B 1/08; C01G 1/00; C01G 15/00; C01G 30/00
[52] U.S. Cl. ............ 252/518.1; 252/519.1; 252/519.12; 252/520.1; 252/520.21; 423/87; 423/115; 423/593; 423/624; 264/104
[58] Field of Search ................ 252/519.1, 519.12, 252/520.1, 520.21, 518.1; 423/111, 115, 593, 87, 618, 624; 264/DIG. 25, 104

[56] References Cited

U.S. PATENT DOCUMENTS

| | | | |
|---|---|---|---|
| 3,449,064 | 6/1969 | Bayer | 423/593 |
| 4,986,933 | 1/1991 | Asada et al. | 252/518 |
| 5,368,995 | 11/1994 | Christian et al. | 430/530 |
| 5,582,909 | 12/1996 | Watanabe et al. | 428/323 |

*Primary Examiner*—Mark Kopec
*Attorney, Agent, or Firm*—Evenson, McKeown, Edwards & Lenahan, P.L.L.C.

[57] ABSTRACT

The invention relates to a double oxide which is transparent and electrically conductive. This double oxide has a defective fluorite crystal structure and is represented by a formula of $In_3Sb_{1-X}O_{7-\delta}$ where X is in a range of from about $-0.2$ to about 0.2, and $\delta$ is in a range of from about $-0.5$ to about 0.5. The double oxide is good in electric conductivity and high in visible light transmittance, in particular in short wavelength region of visible light, as compared with conventional oxide materials.

17 Claims, 2 Drawing Sheets

TRANSPARENT CONDUCTIVE DOUBLE OXIDE AND METHOD FOR PRODUCING SAME

BACKGROUND OF THE INVENTION

The present invention relates to double oxide materials which are superior in both visible light transparency and electric conductivity and are applied to prepare, for example, transparent electrodes of liquid crystal device (LCD) and of solar battery, antistatic film, electromagnetic shielding film, defogging glass, and heat reflective glass.

Of such double oxide materials, indium-oxide-based and tin-oxide-based materials are widely used for the above-mentioned applications, because these materials are relatively high in electric conductivity and have certain degrees of visible light transparency. In the above-mentioned applications, these materials are formed into a compact thin film having a thickness of from about 100 nm to about 1,000 nm, by physical film forming methods, such as sputtering, ion plating and vapor deposition, and by chemical film forming methods, such as sol-gel process, the spraying followed by pyrolysis and chemical vapor deposition (CVD).

Of indium-oxide-based and tin-oxide-based materials, ITO has mainly been used for preparing transparent electrodes of LCD and of solar battery. Recently, the market for these electrodes has rapidly been widening. In fact, ITO is made of indium oxide doped with tin oxide in an amount of from 1 mol % to 10 mol %. ITO has a relatively superior conductivity as compared with other conventional oxide materials. Even ITO is not, however, sufficiently high in conductivity, if it is applied in particular to the transparent electrode of a STN (super twisted nematic) type LCD having a large area. Thus, there is a demand for the development of a novel transparent conductive material having a higher conductivity than that of ITO. As stated above, ITO has a relatively superior conductivity, but is inferior in transparency. That is, it is not so high in visible light transparency, due to its original characteristics. In particular, it has high absorption of light in short wavelength region of visible light. Therefore, it has a defect that an ITO thin film is seen as having a pale blue color. The basic absorption end of ITO is at around 370 nm, and thus ITO hardly transmits a bright light in the ultraviolet region. Therefore, ITO has a disadvantage in energy efficiency in its application to electrode materials of solar battery and the like. Furthermore, indium oxide used as a main component of ITO is not an abundant resource. Thus, its price is considerably high, thereby to increase the cost of ITO film's production, too. Still furthermore, indium oxide is not easily sintered. Thus, it is not easy to produce a high-density indium-oxide target used in sputtering.

Most of conventional transparent conductive materials, such as ITO, are each made of single metal oxides which have cubic crystal structures and p-block elements contained as the major components thereof. Besides such single metal oxides, there are known double oxides having spinel structure and triple rutile structure. Many oxides are n-type semiconducting materials. Therefore, it is necessary to increase the mobility of free electrons acting as charge carriers, under a condition that the carrier concentration of such oxides is high, in order to improve conductivity of the oxides. ITO has a rare-earth C-type crystal structure. Due to this structure, ITO's metal ions are sixfold coordinated by the oxygen ions. With this, there are two holes at the oxygen ion positions per unit lattice, and thus the ITO's unit cell does not have an accurate cubic form, but has some distortion. Such distortion is an obstacle to the increase of the free electrons mobility. Thus, ITO is not sufficiently high in conductivity, as mentioned above.

SUMMARY OF THE INVENTION

It is therefore an object of the present invention to provide a double oxide which has a defective fluorite crystal structure and is high in visible light transmittance and sufficiently high in electric conductivity.

It is another object of the present invention to provide a method for producing such double oxide.

According to the present invention, there is provided a double oxide which is transparent and electrically conductive, said double oxide having a defective fluorite crystal structure and being represented by the following formula (1):

$$In_3Sb_{1-x}O_{7-\delta} \qquad (1)$$

where X is in a range of from about −0.2 to about 0.2, and δ is in a range of from about −0.5 to about 0.5. In other words, a double oxide according to the present invention has p-block elements of the periodic table (i.e., indium and antimony), which are contained as the major components thereof. A double oxide of the present invention is made up of a single phase of defective fluorite crystal structure.

The fluorite crystal structure has a basic elemental arrangement that is similar to that of a rare-earth C-type crystal structure of ITO. In other words, both of these crystal structures have the cubic crystal system, which is highly symmetrical, and a structure wherein oxygen ions do not move to interstitial positions between two metal ions. Thus, both of these crystal structures have desirable conditions to improve free electron's mobility. However, in contrast with the rare-earth C-type crystal structure (sixfold coordination), the fluorite crystal structure has metal ions which are each eightfold coordinated by the oxygen ions. Therefore, the fluorite crystal structure is more symmetrical than the rare-earth C-type crystal structure, and thus the former has a higher free electron mobility than that of the latter.

DESCRIPTION OF THE PREFERRED EMBODIMENTS

Figure 1:
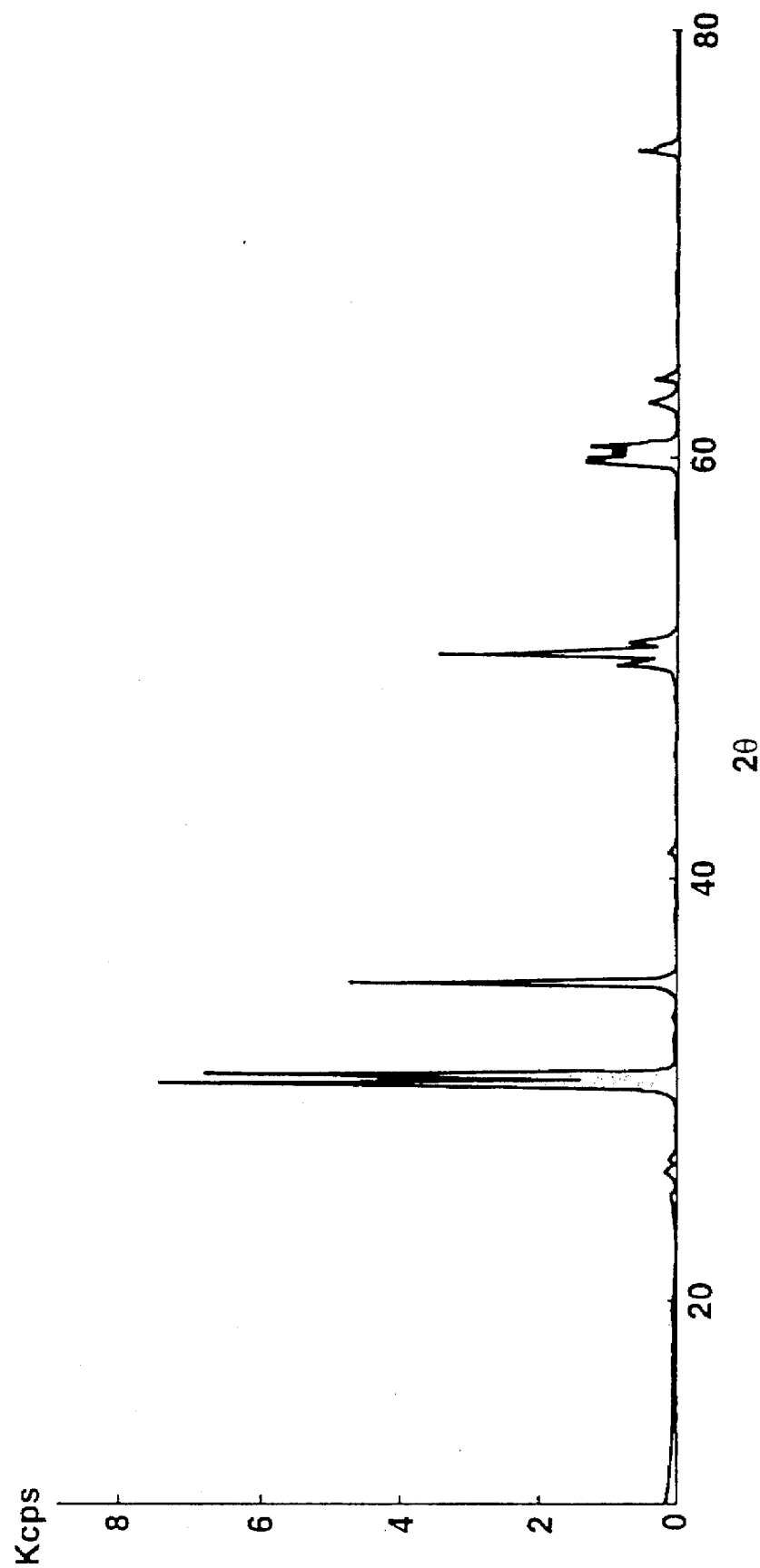
FIG. 1 is an X-ray diffraction spectrum of a sintered body (double oxide) of the after-mentioned Example 1, which has a defective fluorite crystal structure.

As stated above, a double oxide according to the present invention has a defective fluorite crystal structure and is represented by the following formula (1):

$$In_3Sb_{1-x}O_{7-\delta} \qquad (1)$$

where X is in a range of from about −0.2 to about 0.2, and δ is in a range of from about −0.5 to about 0.5.

The defective fluorite crystal structure, such as that of a is double oxide of the present invention, has a structure wherein octahedrons having cations at the center thereof are joined together by sharing their arrises. Therefore, a double oxide of the present invention is expected to have a high mobility of free electrons therein. A double oxide according to the present invention has a band gap that is wider than that of ITO and has a basic absorption end closer to the ultraviolet region. Therefore, the double oxide is expected to have a superior transmittance until a wavelength close to the ultraviolet region, as compared with ITO, because the double oxide does not absorb much of the visible light in its short wavelength region. A double oxide according to the present invention contains indium in an amount less than that of ITO. Therefore, the production cost of a double oxide of the present invention is lower than that of ITO.

It is preferable that each of X and δ of the formula (1) is not 0. With this, the double oxide takes a nonstoichiometric composition, and thus carrier electrons are further introduced into the double oxide, thereby to increase conductivity thereof.

It is an important feature of the present invention that the molar ratio of indium to antimony in the formula (1) is 3:(1-X) where X is in a range from about −0.2 to about 0.2, as shown in the formula (1). If it is not 3:(1-X), there may be formed a secondary phase other than a defective fluorite crystal structure showing a high electric conductivity after sinterring With this, a double oxide of the present invention may be lowered in electric conductivity.

In the invention, it is preferable to introduce a first dopant that is at least one member selected from the group consisting of Sn, Si, Ti and Zr into $In^{3+}$ sites of the double oxide, or to introduce a second dopant that is at least one member selected from the group consisting of Cr, Mo and W into $Sb^{5+}$ sites of the double oxide. With this, it becomes possible to further introduce carrier electrons into the double oxide. These carrier electrons are formed by the charge correction caused by the replacement of $In^{3+}$ or $Sb^{5+}$ by the above higher valence element introduced as the first or second dopant. It is preferable that the first dopant on an elemental basis is in an amount of 0.01–20 atomic %, based on the total number of atoms of In and the first dopant. It is also preferable that the second dopant on an elemental basis is in an amount of 0.01–20 atomic %, base on the total number of atoms of Sb and the second dopant. If the amount of the first or second dopant on an element basis is greater than 20 atomic %, a solid solution of the aimed double oxide may not be formed. With this, there may be formed a secondary phase other than the defective fluorite crystal structure, thereby to lower electric conductivity of the double oxide.

In the invention, there may be used a first or second method for preparing a double oxide of the present invention which is in the form of a sintered body having a relative density of at least 80% or in the form of powder and has a homogeneous composition without having a secondary phase. In the first method, an indium oxide ($In_2O_3$) powder and an antimony oxide ($Sb_2O_3$ or $Sb_2O_5$) powder, each of which has an average particle diameter of up to 1 μm and a chemical purity of at least 99.9%, are uniformly mixed together in a ball mill or the like. This mixing is preferably conducted by wet milling using a solvent such as ethanol. Then, it is subjected to a preliminary sintering at a temperature of 500°–1,000° C. in the atmosphere, thereby to prepare a precursory body. This precursory body is ground in a ball mill or the like. The thus obtained powder is molded. Then, it is subjected to a final sintering at a temperature of 800°–1,400° C. in the atmosphere. If the preliminary sintering temperature is lower than 500° C., the sintered body after the final sintering may become too low in density. If it is higher than 1,000° C., the preliminary sintering may proceed too much. With this, a powder obtained by grinding the precursory body may become too large in particle size, and thus the sintered body after the final sintering may become too low in density. If the final sintering temperature is lower than 800° C., the defective fluorite crystal structure may not sufficiently be formed. If it is higher than 1,400° C., the sintered body may have a secondary phase other than the defective fluorite crystal structure or an antimony deficiency due to sublimation thereof. The period of time for conducting each of the preliminary sintering and the final sintering is not particularly limited and is preferably from 1 to 10 hr.

In the second method for preparing the double oxide, there mixed together a first indium salt (nitrate, acetate, or chloride) aqueous solution and a second antimony salt (nitrate, acetate, or chloride) aqueous solution, each of which salts has a chemical purity of at least 99.9%, to prepare an aqueous solution mixture. Then, this aqueous solution mixture is neutralized by adding an aqueous ammonia dropwise thereto, while the aqueous solution mixture is cooled with ice and stirred. With this, the indium salt is coprecipitated with the antimony salt. The thus coprecipitated salt mixture is separated from the solution mixture and then is washed. Then, this salt mixture is dried. After that, it is subjected to a preliminary sintering in the same manner as that of the first method, to prepare a precursory body. Then, this precursory body is ground in the same manner as that of the first method. The thus obtained powder is dried and molded. Then, it is subjected to a final sintering in the same manner as that of the first method. In the second method, the indium or antimony salt concentration of the first or second aqueous solution is not particularly limited and is preferably within a range of 5–50%. If it is higher than 50%, the indium or antimony salt may precipitate prior to the neutralization. If it is lower than 5%, the coprecipitated salt mixture may become insufficient in amount and too large in particle size. Due to being too large in particle size, the sintered body may become too low in density. As to the neutralization in the second method, the ammonia concentration of the aqueous ammonia, the dropping rate of the aqueous ammonia, the solution mixture's final pH obtained by the neutralization, and other conditions are not particularly limited. It is preferable to conduct the neutralization by adding an aqueous ammonia of which ammonia concentration is as high as possible, with a rate as high as possible, in order to obtain the coprecipitated salt mixture having a fine particle size. During the neutralization, the aqueous solution mixture is preferably maintained at a temperature of up to 50° C. If it is higher than 50° C., the nucleus of the salt mixture may grow too much. Therefore, it may become difficult to obtain the coprecipitated salt mixture having a fine particle size. The above-mentioned final pH of the solution mixture is preferably about 10. If it is lower than about 10, the molar ratio of indium to antimony of the coprecipitated salt mixture may become outside of 3:(1-X) where X is from about −0.2 to about 0.2.

If the double oxide is annealed in a reducing atmosphere (preferably in nitrogen gas or in a gas mixture of nitrogen and hydrogen), oxygen holes are formed therein. The oxygen holes cause the charge correction. With this, it becomes possible to further inject carrier electrons into the double oxide. It is preferable that the annealing is conducted at a temperature of 300°–1,200° C. for a period of time of 1–60 hr under an oxygen partial pressure of $10^{-3}$–$10^{21}$ atmospheres, after the final sintering in the atmosphere.

The following nonlimitative examples are illustrative of the present invention.

EXAMPLE 1

At first, an $In_2O_3$ powder and an $Sb_2O_3$ powder, each of which has an average particle diameter of up to 1 μm and a chemical purity of 99.9%, were mixed together by wet milling in a ball mill using ethanol, to prepare a slurry wherein the molar ratio of elemental indium to elemental antimony is 3:1. Then, this slurry was dried at 60° C. for 24 hr, followed by a preliminary sintering at 700° C. for 5 hr in an alumina crucible. The thus obtained precursory body was ground into a powder by wet milling in a ball mill using ethanol. After drying, 2 wt % of polyvinyl alcohol (PVA) serving as a binder was added to the powder. Then, the particle diameter of the powder was adjusted to be up to 150 µm. Then, the powder was subjected to a uniaxial molding and then to a rubber pressing under a load of 2 t/cm$^2$, thereby to obtain a green disk having a diameter of 15 mm and a thickness of 3 mm. This green disk was subjected to a final sintering at 1,300° C. for 5 hr in the atmosphere.

The thus prepared sintered body had a grayish green color, and was found to have only a phase of the defective fluorite crystal structure of $In_3SbO_7$, which is highly symmetrical, as shown in FIG. 1, by a powder X-ray diffraction analysis. This sintered body was subjected to an electric conductivity test. In this test, the sintered body was cut into a rectangular solid, using a diamond cutter. Then, the electric conductivity of this solid was measured by an ordinary direct-current four-terminals method, using a device having voltage and current electrodes. The sintered body was found to have a good electric conductivity which is higher than that of the after-mentioned Comparative Example 1.

EXAMPLE 2

In this example, Example 1 was repeated except in that there was prepared a slurry wherein the molar ratio of elemental indium to elemental antimony was 3:0.9. The sintered body obtained by the final sintering had a grayish green color, and was found to have only a phase of the defective fluorite crystal structure, by a powder X-ray diffraction analysis. This sintered body had a good electric conductivity which was higher than that of Example 1.

EXAMPLE 3

In this example, Example 1 was repeated except in that the $In_2O_3$ powder, the $Sb_2O_3$ powder, and a tin oxide powder having an average particle diameter of up to 1 µm and a chemical purity of 99.9% were mixed together to prepare a slurry containing 2.9 parts by mol of elemental indium, 1 part by mol of elemental antimony, and 0.1 parts by mol of elemental tin. The sintered body obtained by the final sintering had a grayish green color, and was found to have only a phase of the defective fluorite crystal structure, by a powder X-ray diffraction analysis. This sintered body had a good electric conductivity which was higher than that of Example 1.

EXAMPLE 4

In this example, Example 1 was repeated except in that the sintered body obtained by the final sintering was subjected to an annealing in a reducing atmosphere (i.e., in nitrogen gas flow) at 1,000° C. for 10 hr under atmospheric pressure. The crystal structure of the sintered body did not change by the annealing. The annealed sintered body had a dark grayish green color and a good electric conductivity which was higher than that of Example 1.

EXAMPLE 5

At first, an $In(NO_3)_3$ powder and an $Sb(NO_3)_3$ powder, each of which has a chemical purity of 99.9%, were dissolved in distilled water with stirring, to prepare a solution containing 3 parts by mol of elemental indium and 1 part by mol of elemental antimony. Then, 28% aqueous ammonia was added dropwise to this solution, while this solution was cooled with ice, until pH of this solution reached 10. With this neutralization, the salt mixture of $In(NO_3)_3$ and $Sb(NO_3)_3$ coprecipitated. The thus coprecipitated salt mixture was separated from the solution, then washed, then dried at 150° C. for 24 hr, and then subjected to a preliminary sintering in an alumina crucible at 500° C. for 5 hr. Then, the same steps as those of Example 1 were conducted, thereby to prepare a sintered body from the precursory body.

The thus prepared sintered body had a grayish green color, and was found to have only a phase of the defective fluorite crystal structure, by a powder X-ray diffraction analysis. This sintered body had a good electric conductivity, which was higher than that of Example 1, and a density which was higher than that of Example 1.

COMPARATIVE EXAMPLE 1

Figure 2:
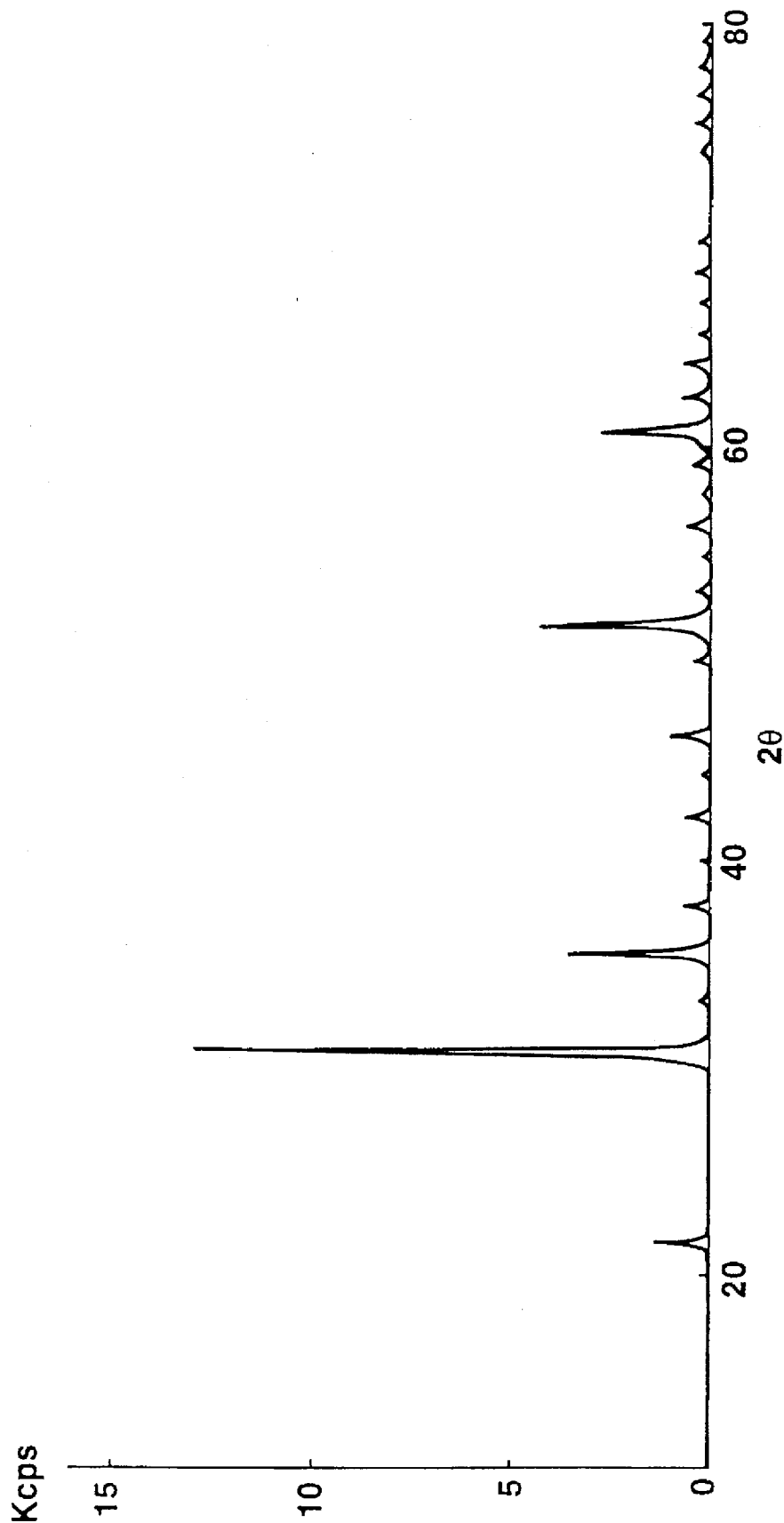
FIG. 2 is a view similar to FIG. 1, but showing that of a sintered body of the after-mentioned Comparative Example 1, which has a rare-earth C-type crystal structure.

In this comparative example, Example 1 was repeated except in that the $In_2O_3$ powder and the $Sb_2O_3$ powder were mixed together to prepare a slurry wherein the molar ratio of elemental indium to elemental antimony is 0.95:0.05. The sintered body obtained by the final sintering had a pale green color, and was found to have only a phase of rare-earth C-type crystal structure of $In_2O_3$, which is not highly symmetrical as that of Example 1, as shown in FIG. 2, by a powder X-ray diffraction analysis. This sintered body had an electric conductivity that was lower than that of Example 1.

EXAMPLE 6

In this example, Example 1 was repeated except in that the preliminary sintering was conducted at 500° C., in place of 700° C., and that the final sintering was conducted at 1,250° C., in place of 1,800° C. The thus prepared sintered body was found to have only a phase of the defective fluorite crystal structure, by a powder X-ray diffraction analysis.

Evaluation tests on the sintered body were conducted as follows. The diffuse reflectance test was conducted as a first test, using wavelengths as shown in Table 1. This test is equivalent to transmittance test, because the sintered body was a polycrystalline ceramic. In the diffuse reflectance test, a test sample was prepared by grinding the sintered body to obtain a powder, and then by subjecting this powder to a uniaxial molding, thereby to obtain the test sample having a diameter of 25 mm and a thickness of 3 mm. In this test, a white-color standard sample was prepared from a MgO powder having a chemical purity of 99.99%, in the same manner as that to prepare the test sample. The test results are shown in Table 1.

It is understood from Table 1 that the double oxides according to Example 6 and the after-mentioned Examples 7–9 have much higher diffuse reflectances (i.e., much higher visible light transmittances) and in particular significantly higher diffuse reflectances (i.e., significantly lower visible light absorption) in the short wavelength side (450 nm) of the visible light region, as compared with the ITO of the after-mentioned Comparative Example 2.

TABLE 1

| Wave-length (nm) | Diffuse Reflectance (%) | | | | |
|---|---|---|---|---|---|
| | Ex. 6 | Ex. 7 | Ex. 8 | Ex. 9 | Com. Ex. 2 |
| 450 | 55 | 51 | 50 | 48 | 15 |
| 550 | 59 | 55 | 55 | 57 | 38 |
| 700 | 55 | 48 | 45 | 40 | 30 |

As a second test, the electric conductivity test was conducted. In this test, the sintered body was cut into a rectangular solid, using a diamond cutter. Then, the electric conductivity of this solid was measured at temperatures of −40° C., 25° C. (room temperature) and 100° C., by an ordinary direct-current four-terminals method, using a device having voltage and current electrodes. The test results are shown in Table 2. It is understood from Table 2 that the double oxides of Examples 6–7 have electric conductivities which are similar to that of the ITO of Comparative Example 2 and that the double oxides of Examples 8–9 have electric conductivities which are much higher than that of the ITO of Comparative Example 2.

TABLE 2

| Temp. (°C.) | Electric conductivity (S/cm) | | | | |
|---|---|---|---|---|---|
| | Ex. 6 | Ex. 7 | Ex. 8 | Ex. 9 | Com. Ex. 2 |
| −40 | $2.3 \times 10^2$ | $3.0 \times 10^2$ | $4.2 \times 10^2$ | $5.5 \times 10^2$ | $3.0 \times 10^2$ |
| 25 | $2.2 \times 10^2$ | $2.8 \times 10^2$ | $4.2 \times 10^2$ | $5.4 \times 10^2$ | $2.3 \times 10^2$ |
| 100 | $2.1 \times 10^2$ | $2.6 \times 10^2$ | $4.0 \times 10^2$ | $5.3 \times 10^2$ | $2.0 \times 10^2$ |

EXAMPLE 7

In this example, Example 6 was repeated except in that there was prepared a slurry wherein the molar ratio of elemental indium to elemental antimony was 3:0.9. The sintered body obtained by the final sintering was found to have only a phase of the defective fluorite crystal structure, by a powder X-ray diffraction analysis.

EXAMPLE 8

In this example, Example 6 was repeated except in that the $In_2O_3$ powder, the $Sb_2O_3$ powder, and a tin oxide powder having an average particle diameter of up to 1 μm and a chemical purity of 99.9% were mixed together to prepare a slurry containing 2.9 parts by mol of elemental indium, 1 part by mol of elemental antimony, and 0.1 parts by mol of elemental tin. The sintered body obtained by the final sintering was found to have only a phase of the defective fluorite crystal structure, by a powder X-ray diffraction analysis.

EXAMPLE 9

In this example, Example 6 was repeated except in that the sintered body obtained by the final sintering was subjected to an annealing in a reducing atmosphere (i.e., in nitrogen gas flow) at 1,000° C. for 10 hr under atmospheric pressure. The crystal structure of the sintered body did not change by the annealing.

COMPARATIVE EXAMPLE 2

In this comparative example, Example 6 was repeated except in that the $In_2O_3$ powder and a tin oxide powder were mixed together to prepare a slurry wherein the molar ratio of elemental indium to elemental tin is 0.9:0.1, that the preliminary sintering was conducted at 1,000° C., and that the final sintering was conducted at 1,400° C. The sintered body (i.e., ITO) was found to have only a phase of the rare-earth C-type crystal structure.

What is claimed is:

1. A double oxide which is transparent and electrically conductive, said double oxide having a defective fluorite crystal structure and being represented by a formula of $In_3Sb_{1-X}O_{7-\delta}$ where X is in a range of from about −0.2 to about 0.2, and δ is in a range of from about −0.5 to about 0.5.

2. A double oxide which is transparent and electrically conductive, said double oxide having a defective fluorite crystal structure and being represented by a formula of $In_3SbO_7$.

3. A double oxide which is transparent and electrically conductive, said double oxide having a defective fluorite crystal structure and being represented by a formula of $In_3Sb_{1-X}O_{7-\delta}$ where X is a number that is in a range of from about −0.2 to about 0.2 and is different from 0, and δ is in a range of from about −0.5 to about 0.5 and is different from 0.

4. A double oxide according to claim 1, wherein indium contained in said double oxide is doped with at least one first element that is selected from the group consisting of Sn, Si, Ti, and Zr, said at least one first element being in an amount of 0.01–20 atomic % based on the total number of atoms of said indium and said at least one first element.

5. A double oxide according to claim 1, wherein antimony contained in said double oxide is doped with at least one second element that is selected from the group consisting of Cr, Mo, and W, said at least one second element being in an amount of 0.01–20 atomic % based on the total number of atoms of said antimony and said at least one second element.

6. A double oxide according to claim 1, which has a carrier electron injected therein by forming an oxygen hole through an annealing of said double oxide in a reducing atmosphere.

7. A method for producing a double oxide which is transparent and electrically conductive, said double oxide having a defective fluorite crystal structure and being represented by a formula of $In_3Sb_{1-X}O_{7-\delta}$ where X is in a range of from about −0.2 to about 0.2, and δ is in a range of from about −0.5 to about 0.5, said method comprising the following sequential steps of:

(a) providing a mixture of $In_2O_3$ and an antimony oxide represented by $Sb_2O_3$ or $Sb_2O_5$;

(b) subjecting said mixture to a preliminary sintering at a temperature of 500°–1,000° C. to obtain a precursory body;

(c) grinding said precursory body into a powder;

(d) molding said powder into a mold; and (e) subjecting said mold to a final sintering at a temperature of 800°–1,400° C. to obtain said double oxide.

8. A method according to claim 7, wherein each of said $In_2O_3$ and said antimony oxide has an average particle diameter of up to 1 μm and a chemical purity of at least 99.9%.

9. A method according to claim 7, wherein said mixture of the step (a) is prepared by a wet milling.

10. A method according to claim 7, wherein, after the step (e), said double oxide is subjected to an annealing at a temperature of 300°–1,200° C. for a period of time of 1–60 hr in a reducing atmosphere having an oxygen partial pressure of $10^{-3}$–$10^{21}$ atmospheres.

11. A method according to claim 10, wherein said reducing atmosphere contains nitrogen gas or a mixture of nitrogen and hydrogen gases.

12. A method for producing a double oxide which is transparent and electrically conductive, said double oxide having a defective fluorite crystal structure and being represented by a formula of $In_3Sb_{1-x}O_{7-\delta}$ where X is in a range of from about −0.2 to about 0.2, and $\delta$ is in a range of from about −0.5 to about 0.5, said method comprising the following sequential steps of:

(a) mixing a first aqueous solution of an indium salt with a second aqueous solution of an antimony salt to prepare a solution mixture;

(b) neutralizing said solution mixture by dropwise adding an aqueous ammonia thereto such that said indium salt coprecipitates with said antimony salt to form a precipitate in said solution mixture;

(c) separating said precipitate from said solution mixture;

(d) subjecting said precipitate to a preliminary sintering at a temperature of 500°–1,000° C. to obtain a precursory body;

(e) grinding said precursory body into a powder;

(f) molding said powder into a mold; and (g) subjecting said mold to a final sintering at a temperature of 800°–1,400° C. to obtain said double oxide.

13. A method according to claim 12, wherein each of said indium salt and said antimony salt has a chemical purity of at least 99.9%.

14. A method according to claim 12, wherein the step (b) is conducted, while said solution mixture is stirred and cooled with ice so as to maintain said solution mixture at a temperature of up to 50° C.

15. A method according to claim 12, wherein said first and second aqueous solutions contain said indium salt and said antimony salt in a concentration of from 5 to 50%, respectively.

16. A method according to claim 12, wherein the step (b) is conducted until said solution mixture reaches a pH of about 10.

17. A method according to claim 12, wherein said indium salt of the step (a) is one compound selected from the group consisting of indium nitrates, indium acetates, and indium chlorides, and said antimony salt of the step (a) is one compound selected from the group consisting of antimony nitrates, antimony acetates, and antimony chlorides.

* * * * *